United States Patent [19]
Hirakawa

[11] Patent Number: 6,004,167
[45] Date of Patent: Dec. 21, 1999

[54] TERMINAL BLOCK

[75] Inventor: Mamoru Hirakawa, Tokyo, Japan

[73] Assignee: Jonan Denki Seiki Ltd., Japan

[21] Appl. No.: 08/849,713

[22] PCT Filed: Dec. 9, 1994

[86] PCT No.: PCT/JP94/02072

§ 371 Date: Jun. 3, 1997

§ 102(e) Date: Jun. 3, 1997

[87] PCT Pub. No.: WO96/18221

PCT Pub. Date: Jun. 13, 1996

[51] Int. Cl.$^6$ .............................. H01R 4/36; F04B 17/04
[52] U.S. Cl. ............................................. 439/811; 411/416
[58] Field of Search ..................... 439/810–814; 411/308–310, 411, 416, 424

[56] References Cited

U.S. PATENT DOCUMENTS

| | | | |
|---|---|---|---|
| 2,352,982 | 1/1944 | Harding | 411/422 |
| 2,414,870 | 1/1947 | Tomalis | 411/301 |
| 2,907,978 | 10/1959 | Bergan | 439/811 |

FOREIGN PATENT DOCUMENTS

| | | | |
|---|---|---|---|
| 37 24 884 | 2/1989 | Germany . | |
| Y1-31-661 | 1/1956 | Japan . | |
| 56-75311 | of 1981 | Japan . | |

*Primary Examiner*—Gary F. Paumen
*Assistant Examiner*—Briggitte R. Hammond
*Attorney, Agent, or Firm*—Pennie & Edmonds LLP

[57] ABSTRACT

This invention provides a terminal block capable of effectively preventing a screw in a clamping portion from being loosened. It has a block body (4), and a clamping member (10) adapted to clamp an object so as to be pressed against a clamping surface (4c) at an inner lower portion of the block body (4). The block body is formed by bending an elongated metal plate at four portions thereof at right angles in the same direction and superposing one of a first and final flaps (4a, 4b) on the other, these flaps (4a, 4b) being provided with circular threaded bores (4a′, 4b′) so that the threaded bores can be engaged with a shank (1b) of a screw. The clamping member (10) has a screw (1) provided with the threaded shank (1b) having an elliptical cross section being orthogonal to the axis thereof, and a clamping plate (3) joined to a lower end of the shank (1b) of the screw so that the clamping plate (3) is moved vertically in accordance with an axial movement of the screw (1).

2 Claims, 3 Drawing Sheets

FIG. 1
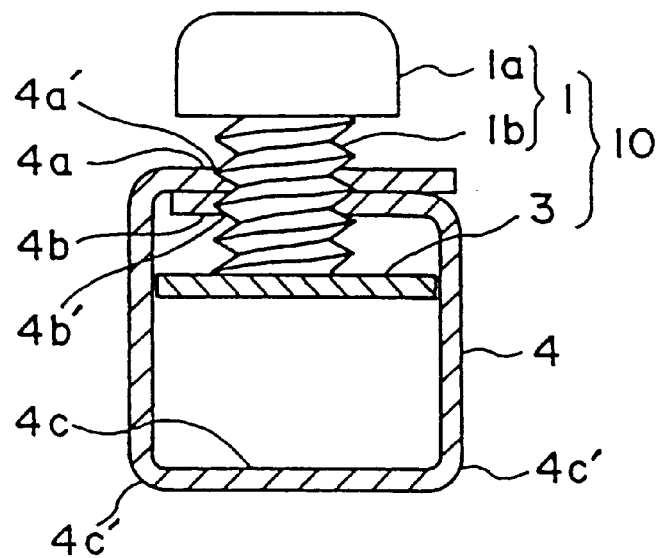
FIG. 2a
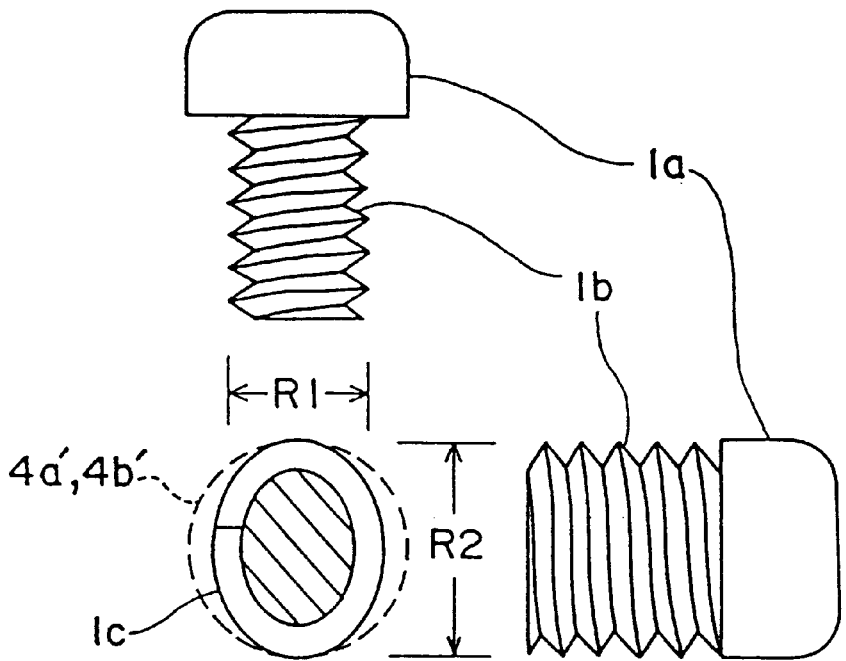
FIG. 2b  FIG. 2c

//TERMINAL BLOCK

TECHNICAL FIELD

This invention relates to a terminal block establishing an electrical connection with a conductive member, such as an end portion of an electrical wire, by clamping the conductive member.

BACKGROUND ART

As shown in FIGS. 3 and 4, a conventional terminal block includes, for example, a block body 4 for forming a space for insertion of a wire end 100 which is a conductive portion of the wire, and a clamping portion 30 for clamping the wire end 100 inserted into the space against a clamping surface 4c which is an inner bottom surface of the block body 4.

Clamping portion 30 includes a screw 31 provided with a screw head 31a and a screw shank 31b, and a clamping plate member 33 clamping wire end 100 between clamping surface 4c with a pressure developed by turning of screw 31. Clamping plate member 33 is joined to a lower end of screw shank 31b so that clamping plate 33 is moved vertically in accordance with an axial movement of screw 31.

The block body 4 is formed, for example, by bending an elongated metal plate member at right angles at four positions in the same direction and superposing the first flap 4a and the last flap 4b. Flaps 4a and 4b are provided with threaded bores each with a thread matching the thread of screw shank 31b. Flaps 4a, 4b are disposed to overlap each other so that centers of these threaded bores coincide when a wire end 100 is not clamped.

In the conventional terminal block with the configuration mentioned above, a wire end 100 inserted between the clamping plate member 33 and the clamping plate 4c is clamped by tightening the screw 31. The terminal block is able to establish an electrical connection with the electrical wire through the conductive portion of the clamped wire end 100, by constructing one of the clamping plate member 33 or the clamping surface 4c from a conductive material.

As the screw 31 is tightened further, flaps 4a, 4b of the block body 4, in which the threaded bores are formed, start to open outwards. Flaps 4a, 4b develop spring elastic forces since the block body 4 is composed of metal. These elastic forces are utilized to press the screw 31 downward constantly so as to prevent the screw 31 from being loosened.

However, the mechanism for preventing the screw 31 from being loosened in the conventional terminal body is not effective enough in some cases. For example, the loosening of the screw 31 may not be sufficiently prevented, depending on the strength of mechanical vibrations applied to the terminal block. In such a case, the clamping force on a wire end 100 may not be strong enough, and in the worst case the wire end 100 may come away from the terminal block.

DISCLOSURE OF INVENTION

The object of the present invention is to provide a terminal block which can more effectively prevent a screw in the clamping portion from being loosened.

The above object can be attained by a terminal block comprising a clamping portion for clamping a wire end and a block body in which the clamping portion is mounted, wherein the block body comprises a base portion in which a clamping surface is formed against which the wire end is clamped, and a pair of plate portions which are being superposed on each other at a place facing the clamping surface, each of the plate portions having a circular threaded bore; and the clamping portion comprises a clamping plate member being disposed between the clamping surface and the pair of plate portions to clamp the wire end against the clamping surface, and a screw going through both threaded bores in the pair of plate portions and pressing the clamping plate member toward the clamping surface; wherein, the screw has a threaded shank with an elliptic cross section and its major axis is the same as a diameter of the threaded bore formed in each of the plate portions, and the pair of plate portions are elastically connected to the base portion so as to be able to move with respect to each other, so that when a pressure, which is developed due to clamping of the wire end in a direction opposite to a moving direction of the screw during the tightening, is applied on the pair of plate portions via the screw, centers of the threaded bores are shifted by an amount corresponding to the pressure, and when the pressure is applied, centers of the threaded bores are aligned approximately along the same axis.

In the terminal block according to the present invention, a wire end is inserted into the block body, and placed between the clamping surface in the base portion of the block body and the clamping plate member. Then the wire end is clamped between the clamping surface and the clamping plate member by tightening the screw in the clamping portion to press the clamping plate member.

A force due to a reaction of the pressure on the clamping plate member is directed opposite to a moving direction of the screw during the tightening. The reaction force presses the pair of plate portions in which the screw is mounted from the inside of the block body to the outside.

The pair of plate portions are displaced according to the reaction force. When there is no reaction force, two centers of circular threaded bores formed in each of plate portions, which had been aligned along the same axis, are shifted with respect to each other and together form an elliptic threaded bore.

According to the present invention, the screw is provided having an elliptical cross section which is in an orthogonal direction to the screw axis. Therefore once a shape of the elliptical threaded bore formed from the pair of plate portions is made coincident with the elliptical screw after tightening the screw to clamp the wire end with a sufficient clamping force, it is necessary to change a shape of the bore formed from the pair of plate portions from an elliptical one to the original circular shape to allow the screw to be loosened.

However, a force resisting the reaction force is required to change a shape of the bore formed from two threaded bores to a circular shape by displacing the pair of plate portions back to the original position.

Accordingly the present invention is capable of effectively preventing the screw of the terminal block from being loosened.

BRIEF DESCRIPTION OF THE DRAWINGS

FIG. 1 is a cross-sectional view showing a configuration of an embodiment of the terminal block in accordance with the invention;

FIG. 2(a) is a side view of the screw utilized in the embodiment of FIG. 1;

FIG. 2(b) is a cross-sectional view of the screw utilized in the embodiment of FIG. 1;

FIG. 2(c) is another side view of the screw utilized in the embodiment of FIG. 1;

BEST MODE FOR CARRYING OUT THE INVENTION

Figure 3:
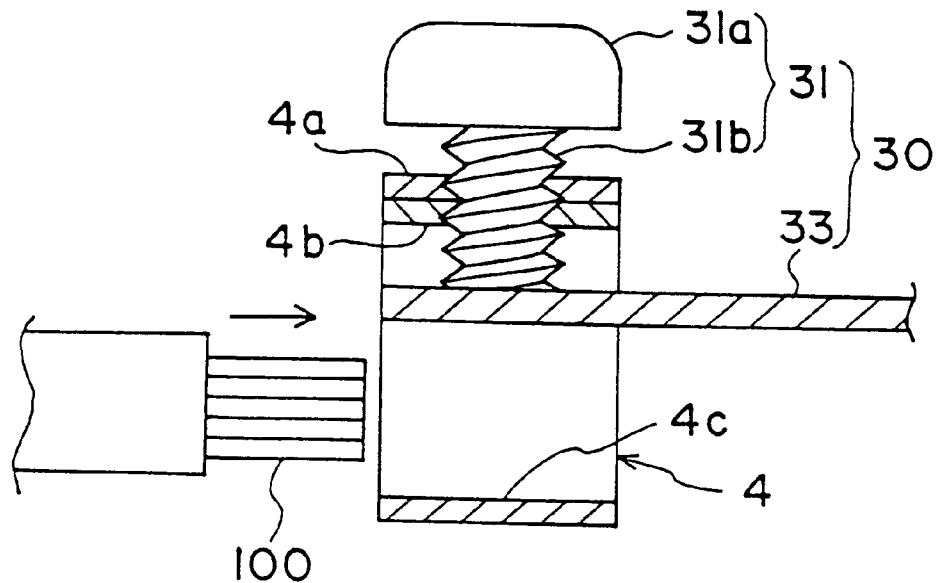
FIG. 3 is a cross-sectional view showing a configuration of a conventional terminal block.
Figure 4:
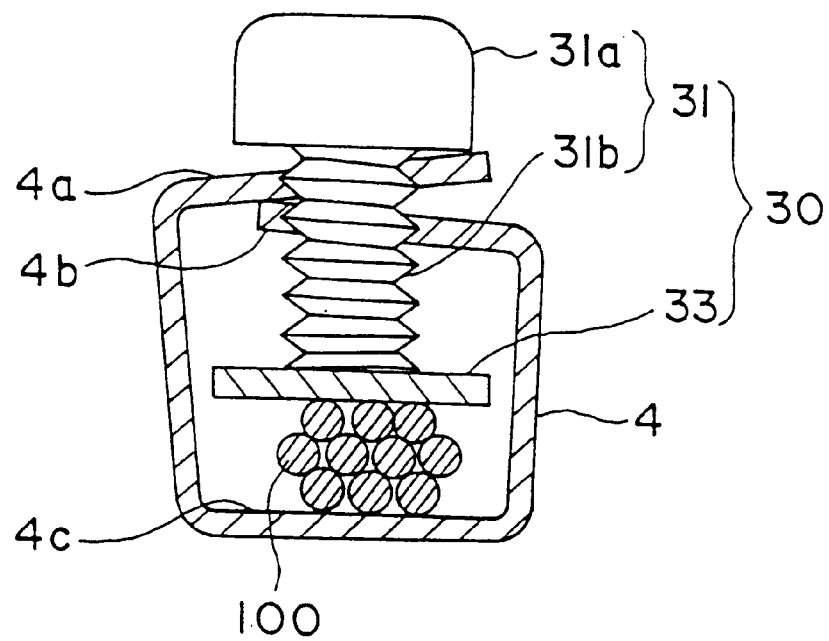
FIG. 4 is a cross-sectional view explaining the operation of the conventional terminal block.

An embodiment of the terminal block in accordance with the invention will be explained with reference to the figures.

As shown in FIG. 1, the terminal block in the present embodiment includes a block body 4 forming a space into which a conductive member, such as an end of an electrical wire, is inserted, and a clamping portion 10 clamping the conductive member inserted into the space against a clamping surface 4c which is an inner bottom surface of block body 4.

The block body 4 is formed, for example, by bending a long and narrow metal plate member at right angles at four positions in the same direction and superposing the first flap 4a and the last flap 4b. The flaps 4a, 4b are provided with circular threaded bores 4a', 4b', each being threaded to match a thread of a screw shank 1b.

The clamping portion 10 includes a screw 1 provided with a screw head 1a and a screw shank 1b, and a clamping plate member 3 connecting to a lower end of the screw shank 1b so as to move vertically in accordance with an axial movement of the screw 1.

The screw 1 is mounted on the block body 4 by screwing through two threaded bores 4a' and 4b' respectively formed in the flaps 4a, 4b so that a lower portion of the screw shank 1b protruding downward is joined to a clamping plate member 3.

As shown in FIG. 2, the screw shank 1b of screw 1 is formed so as to have an elliptical (oval) shape at cross section 1c along a direction orthogonal to the screw axis. The major axis R2 of this ellipse is the same length as the diameters of threaded bores 4a', 4b', and its minor axis R1 is less than the major axis R2.

Screw 1, for example, may be manufactured as a typical metal screw manufactured using a conventional method, i.e. a screw having a circular cross-sectional shape, by applying a pressure on the conventional screw along a direction orthogonal to the screw axis to deform it without damaging its thread.

As will become clear from the following description regarding operation of the embodiment in accordance with the present invention, the loosening of the screw can be effectively prevented compared to the conventional terminal block, regardless of the exact shape of an ellipse or the ratio of the minor axis R1 to the major axis R2, as long as the cross-sectional shape 1c is elliptical. Therefore, in the present invention, the exact shape of an ellipse is not limited to any particular one and a value of the minor axis R1 may be arbitrary decided within a range which is less than the length of the major axis R2, as long as the major axis R2 is the same length as the diameters of the threaded bores 4a', 4b'.

An operation of the embodiment will now be described.

In the terminal block of the embodiment, the wire end which is a conductive portion of the electrical wire is inserted between the clamping plate member 3 and the clamping surface 4c, and then the screw 1 is tightened to clamp and secure the wire end. By forming the clamping plate member 3 or clamping surface 4c with a conductive material, an electrical connection between the wire end and the terminal block may be established via the conductive material.

When screw 1 is not pressing clamping plate member 3, centers of threaded bores 4a', 4b' of flaps 4a, 4b are aligned along the same axis and the threaded bore formed from these two threaded bores has a circular shape. Threaded bores 4a', 4b' are threaded with the same pitch as that of the screw 1. Thus, screw 1 rotates while contacting the bores at its circumferential parts corresponding to the major axis R2.

When the wire end is being clamped, a pressure is applied on the clamping plate member 3, and at the same time the reaction force opposite to the pressure is developed. The reaction force presses flaps 4a, 4b of the block body 4 upward through the screw 1.

Figure 5:
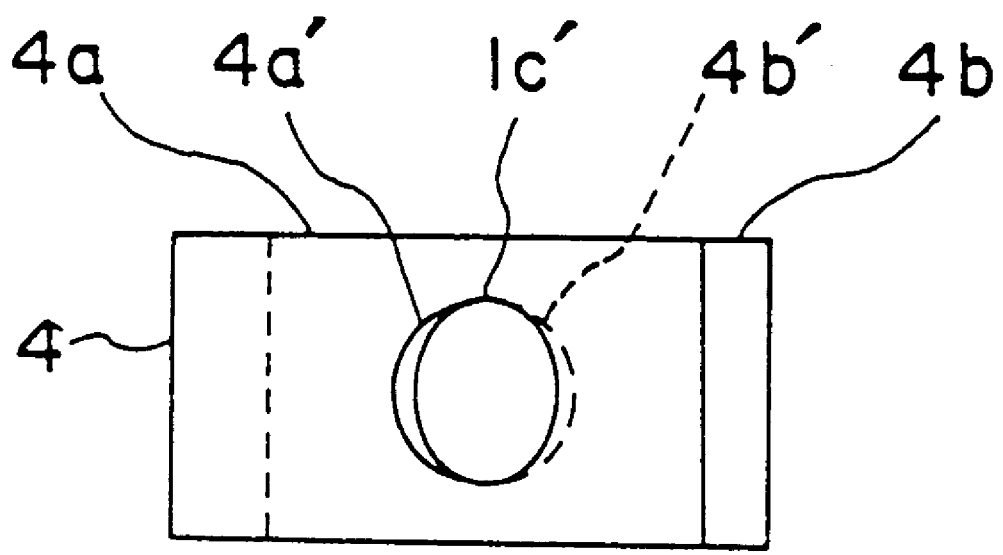
FIG. 5 is a plan view of the block body explaining how the position of flaps 4a, 4b in the block body of the embodiment of FIG. 1 shifts.

Flaps 4a, 4b are parts of block body 4, and each is fixed to the main part by a single edge. Since the whole of the flap cannot move upward, flaps 4a, 4b are deformed so that each of these flaps opens outwardly around one of their connecting edges or edges 4c' located on both sides of the clamping surface 4c, which works as a rotating axis. Then, as shown in FIG. 5, the centers of the two circular threaded bores 4a', 4b' of flaps 4a, 4b, which had been aligned along the same axis, are shifted with respect to each other so as to tend to form a threaded bore 1c' whose shape is substantially elliptical.

Further, the screw 1 is constantly pressed downward due to the spring elastic force caused by the deformation of flaps 4a, 4b since the block body 4 is metallic.

When the screw 1 having an elliptic cross section in an orthogonal direction to the screw axis is utilized in the block body 4 of the above mentioned state, and once the elliptic threaded bore 1c' formed from two threaded bores 4a', 4b' has been made coincident with the elliptical cross-sectional shape 1c of screw 1, it requires a stronger force than the force exerted during the tightening to cause the screw 1 to become loose.

This is because, in order to loosen the screw 1, it is necessary to change the shape of the bore formed from threaded bores 4a', 4b' of the two flaps 4a, 4b from the elliptical shape to the original circular shape. This means that a force is required to displace the two flaps 4a, 4b back to their original positions while resisting the reaction force so as to make the centers of the threaded bores 4a', 4b' coincident.

Therefore the embodiment is capable of effectively preventing the screw 1 of the clamping portion 10 in the terminal block from being loosened.

Although the example in which the flaps 4a, 4b and the rest of the block body 4 are constructed into single body is described in the embodiment, the present invention is not limited to this example. The block terminal may, for example, be constructed in such a way to include a U shaped member and flaps 4a, 4b, which are separated parts having features described above, of being combined by fixing one edge of each flap at the two edges of the U shaped member.

Therefore the present invention is capable of effectively preventing the screw in the clamping portion from being loosened.

I claim:

1. A terminal block comprising a clamping portion clamping a wire end and a block body in which the clamping portion is mounted, wherein said block body comprises a base portion wherein a clamping surface is formed, against which the wire end is clamped, and a pair of plate portions which are superposed to each other at a place facing said clamping surface, each having a circular threaded bore;

and said clamping portion comprises a clamping plate member being disposed between said clamping surface and said pair of plate portions to clamp the wire end against said clamping surface and a screw going through both threaded bores in said pair of plate portions and pressing said clamping plate member toward said clamping surface; wherein, said screw has a threaded shank with an elliptical cross section along the entire length thereof and its major axis is the same as a diameter of the threaded bore formed in each of said plate portions, and said pair of plate portions are elastically connected to said base portion so as to be able to move with respect to each other, so that when a pressure, which is developed due to clamping of the wire end in a direction opposite to a moving direction of said screw during the tightening, is applied on said pair of plate portions via said screw, centers of said threaded bores are shifted by an amount corresponding to said pressure, and when no pressure is applied, centers of said threaded bores are aligned approximately along the same axis.

2. The terminal block according to claim 1, wherein said block body is formed by bending a long and narrow metal plate at four positions at right angles in the same direction and superposing one of the first and final flaps on the other; and wherein said pair of plate portions are first and final flaps of said plate portions.

* * * * *